United States Patent [19]
Brown et al.

[11] 3,817,211
[45] June 18, 1974

[54] APPARATUS FOR IMPREGNATING STRANDS, WEBS, FABRICS AND THE LIKE

[75] Inventors: Alfred W. Brown, Woonsocket, R.I.; Richard J. Moran, Norton, Mass.

[73] Assignee: Owens-Corning & Fiberglas Corporation, Toledo, Ohio

[22] Filed: Feb. 22, 1972

[21] Appl. No.: 227,958

[52] U.S. Cl. .............. 118/630, 28/72.1, 28/75 WT, 118/DIG. 5, 118/627
[51] Int. Cl. .............................................. B06b 5/02
[58] Field of Search ............ 117/17, 93.4 R, DIG. 6, 117/93.4; 28/72.12, 72.1, 75 WT, 1.2; 118/DIG. 5, 627, 629, 630, 634, 309

[56] References Cited
UNITED STATES PATENTS

| | | | |
|---|---|---|---|
| 2,730,455 | 1/1956 | Swann .................... | 117/4 |
| 2,750,681 | 6/1956 | Berry ..................... | 34/57 |
| 2,852,906 | 9/1958 | Breen ..................... | 57/34 |
| 3,046,632 | 7/1962 | Tsutsumi ................. | 28/1 |
| 3,248,253 | 4/1966 | Barford et al ............ | 117/17 |
| 3,670,699 | 6/1972 | Sargent .................. | 118/629 |
| 3,695,909 | 10/1972 | Fabre et al .............. | 117/17.5 |
| 3,707,024 | 12/1972 | Mayer et al ............. | 28/75 WT |

*Primary Examiner*—Mervin Stein
*Assistant Examiner*—Leo Millstein
*Attorney, Agent, or Firm*—Staelin & Overman

[57] ABSTRACT

A preferred embodiment of the invention is illustrated in an apparatus for impregnating a glass fiber strand. Particulate impregnant material is provided in a gaseous suspension. The particles of impregnant material are electrically charged with charges having a first polarity. The individual glass fibers are treated to render the surfaces thereof at least semi-conductive electrically. The glass fiber strand is opened and the individual glass fibers are separated from each other by electrostatically charging the semi-conductive surface of each of the fibers with charges having a second polarity, thereby causing the fibers to repel each other. The strand of separated glass fibers is passed through the gaseous suspension to enable the attraction of particles with a charge of the first polarity and adherence to the surface of the individual fibers having charges of the second polarity. The individual glass fibers in the strand may be treated by controllably moistening the strand to provide the fibers with a surface layer of moisture, as by passing the strand of glass fibers through a steam bath which penetrates the strand and, if the strand has sizing thereon, softens the binding components of the size. The individual glass fibers may be also treated by applying a sizing which includes an electrolytic material to the fibers before gathering the fibers together into the strand form, the electrolytic material having ions which are opposite in polarity to the electrostatic charges on the particles. The step of opening the strand may include generating an electrostatic field to provide the particles with charges on the first polarity, and locating a grounded electrode within the influence of the first polarity electrostatic field. The strand passing in contact with or within the range of influence of the electrode and also in the influence of the first electrostatic field enables the induction of electrostatic charges of the second polarity on the surfaces of the fibers in the strand. Alternately, the strand may be grounded before it enters the first electrostatic field, and then passed through the first electrostatic field in a fluidized bed of particulate impregnant and within the range of influence of an electrode disposed within the first electrostatic field. As a still further alternative, a second electrostatic field may be generated to charge the surfaces of the fibers with the charges of the second polarity. After adherence to the strand the particles may be coalesced to substantially coat each one of the fibers, and the fibers may be gathered together to provide a unitary, substantially impregnated multi-fiber strand. The invention is also applicable to webs, fabrics, and the like, made from multi-filament strands.

17 Claims, 4 Drawing Figures

APPARATUS FOR IMPREGNATING STRANDS, WEBS, FABRICS AND THE LIKE

BACKGROUND OF THE INVENTION

Impregnated multi-filament strands, and webs or fabrics formed from such strands and having the strands impregnated before or after web formation, have many uses in today's manufacturing processes and in applications individually. For example, glass fiber reinforced plastic pellets, lengths of impregnated strand, and webs of impregnated strand have been used in the production of articles by the process of molding, such reinforcement technique applications growing continuously within the last few years. This growth and the prospects for continuing growth are attributable to the fact that the use of glass or textile type filaments in molding processes results in a final product having superior mechanical properties such as increased impact strength, tensile strength, flexural modulus, and the like.

Further, such impregnated strands may be utilized in other products such as automobile tires, layer-by-layer buildup of articles such as large tanks where tensile strength properties are very important, to enhance the decorative, abrasion, and tensile strength characteristics of the strands when utilized alone or in fabrics or webs made from such strands, and to provide particular characteristics for a strand for certain applications such as insulative or conductive properties.

In the past several techniques have been utilized to try to attain the desired impregnated strand, web or the like. For example, continuous glass filaments have been guided through a molten bath of the desired molding type synthetic resin contained in a crosshead die extrusion apparatus. The resulting product is an elongated rod-like structure which can be cut into individual pellets suitable for being fed into an injection molding machine. Other methods include passing continuous filaments through a molten bath or emulsion of a synthetic resin or other impregnating material to pick up the desired coating which is then coalesced by cooling, drying or heating to cure the coating material.

These and the other methods of impregnation suffer from the problem that the bundle of filaments that pass through the bath is not readily penetrated by the resin or other impregnant to an appreciable extent. Rather, the resin or other material tends to form a sheet or coating around the bundle, and in many instances the bundle of filaments or fibers remain intact thus detracting from the appearance of the molded article. A more basic defect, however, is that these bundles indicate that a good dispersion of the filaments is not being achieved throughout the article and thus the reason for adding the filaments to the material is impaired since without good dispersion of the filaments throughout the molded article the properties thereof are not improved to the optimum extent. Further, the mutual contact of the filaments with each other permits an abrading contact which is deleterious, particularly to synthetic filaments or fibers.

In an attempt to overcome these problems a process was introduced to the art in U.S. Pat. No. 3,586,560, issued June 22, 1971, in which a bundle of glass filaments or other textile fibers were passed into a bath in which particles of the desired organic plastic material were suspended, and while in the bath it was attempted to maintain the continuous filaments in substantially non-contacting relationship so that a substantial portion of them were separated from each other. The opening or separation of the strand was obtained by placing within the fluidized bed a surface which the strand contacts and, while in contact therewith, changes direction of movement. Theoretically, since the filaments were under tension this contact with the surface would cause them to spread until the filaments separate one from the other.

Adherence of particles to the roving in the abovereferenced patent was achieved by creating an electrostatic charge either on the roving or the particles, but not both. The bundle of filaments were then passed into an oven or a cloud of solvent vapors so that the particles become flowable and coalesce into a coating. In this process only the mechanical contact with the surface and the change of direction was relied upon to mechanically separate the filaments in the strand. It was noted therein that a pickup of organic plastic particles was achieved if an electrostatic charge is induced on the strand before it is carried through the fluidized bed or if the fluidized bed is modified by placing electrodes therein so that the particles of powder receive a charge which will cause them to adhere to the glass or nylon fibers.

While the process just discussed may represent an improvement, the opening of the strand and the separation of the filaments through the mere mechanical process of changing direction of the strand around a surface does not achieve full filament separation. Further, considerable difficulty is met in the above process in attempting to achieve an electrostatic charge on individual fibers in the strand before they are carried through the bed, particularly with synthetic or non-conducting fibers such as glass fibers, nylon, and the like. The induction of an electrostatic charge on an entire strand, as opposed to charges on the individual filaments, does not contribute more to the separation of the filaments than the contact with and change of direction of the strand around a surface in the bed.

Accordingly, the present invention has it its primary object the provision of an improved apparatus for impregnating of a multi-filament strand and the coating of individual fibers in the multi-filament strand or the impregnating of webs, fabrics or the like made up from such multi-filament strands and the coating of individual fibers therein.

Another object of this invention is to provide an improved apparatus for impregnating strands made up of filaments which are essentially non-conductive.

A still further object of this invention is to provide an improved apparatus for impregnating multi-filament strands in which impregnating particles are charged with one polarity and the individual fibers or filaments of the strand are charged with an opposite polarity to enable an optimum attraction and adherence to the individual fibers of the strand by the particles.

It is a still further object of this invention to provide an improved apparatus for impregnating a glass fiber strand or impregnating the strands in a web, fabric, or the like made up of glass fiber strands.

SUMMARY OF THE INVENTION

The above objects and the principles of the invention are illustrated and featured in apparatus for impregnating a strand formed from a plurality of non-conducting filaments, although certain principles of the invention are applicable to the impregnation of a strand formed from conductive filaments to obtain better adhesion and impregnation characteristics.

A fluid suspension of electrostatically charged particulate impregnant material is provided either in bed form or in electrostatic gun form. The particles of the material are provided with electrostatic charges of a first, like polarity. A multi-filament strand is opened and the plurality of strand filaments are separated from each other by electrostatically charging the individual filaments with like charges to cause the filaments to repel each other, the filament charges being opposite in polarity to the charges on the impregnant material particles.

The filaments may be treated to make at least the surfaces thereof at least semi-conductive electrically to enhance the ability to apply and retain an electrostatic charge on each filament. The filament treating may include applying a sizing which includes an electrolytic material to the individual filaments before the filaments are combined into the strand form. The electrolytic sizing preferably includes ions which are opposite in polarity to the electrostatic charge on the particles. For example, an anionic electrolytic material is selected for the sizing when the electrostatic charges on the particles are positive. A cationic electrolytic material is selected for the sizing when the electrostatic charges on the particles are negative.

The strand opening step may include controllably moistening the strand before the electrostatic charges are applied to the filaments, a preferable form of controllably moistening the strand being passing the strand through a steam bath. A strand may be also passed through a fluid which is at least semi-conductive electrically, the fluid preferably being in a vapor form to enable better penetration of the fluid into a strand to provide a layer for each filament.

The particles may be electrostatically charged by generating an electrostatic field of a first polarity in a fluidized suspension of particulate impregnating material. The strand opening step may include treating the filaments to make at least the surfaces thereof semi-conductive electrically and contacting the strand with a grounding means, e.g. a grounded electrode within the influence of the electrostatic field generated for the particles or grounding the strand at feed control nip rolls or grounding the treating bath for the strand, to induce an electrostatic charge on the filaments of a second or opposite polarity. Alternatively, the strand opening step may include treating the filaments thereof to make at least the surfaces semi-conductive electrically and generating a second electrostatic field of a second polarity and passing the strand with the treated filaments through the influence of the second electrostatic field before passing the strand through the suspended particles.

The fluid suspension means may include container means constructed of material which is non-conductive electrically, the container means having a first air plenum chamber and a second particle retaining chamber. A substantially flat, foraminous or micro-porous plate of electrically conductive material is advantageously utilized to separate the two chambers. An electrostatic generator is connected to the foraminous or microporous plate thereby enabling the plate to function both as an air distributor to fluidize a bed of particles in the second chamber and as a means for imparting an electrostatic charge to the fluidized particles. Means for vibrating the container are also advantageously utilized to insure uniform circulation of the particles in the fluidized bed and the application of an electrostatic charge to all of the particles.

The particulate impregnant material may be a powdered synthetic resin which is either thermosetting or thermoplastic. Powdered poleythylene, polypropylene, polyvinyl chloride, and the like may be used. Some materials present problems in controlling the particle size and in avoiding mutual adhesion to each other, such as natural and synthetic rubbers. Powders or particles of these materials may be prepared by a cryogenic drying and/or grinding process. Although this feature is particularly applicable to a cryogenically dried and powdered rubber material, whether synthetic or natural, it is also applicable to other impregnating materials.

Other objects, advantages, and features of this invention will become apparent when the following description is taken in conjunction with the accompanying drawings, in which.

DESCRIPTION OF THE PREFERRED EMBODIMENTS

The above objects and features of this invention have been illustrated herein in preferred embodiments of an apparatus for impregnating a glass fiber strand. Although the invention is herein exemplified in specific detail by reference to impregnated glass fiber strand production, it will be apparent in view of the disclosure that it has application in the production of other fibers or of mats, webs, or fabrics made up of glass fiber strands or multi-filament strands of other materials. Thus, although specific uses of the invention herein disclosed are shown, it is to be noted that the embodiments are illustrative only and not limiting in any sense with the respective apparatus, process, product or other use of this invention as disclosed herein.

Figure 1:
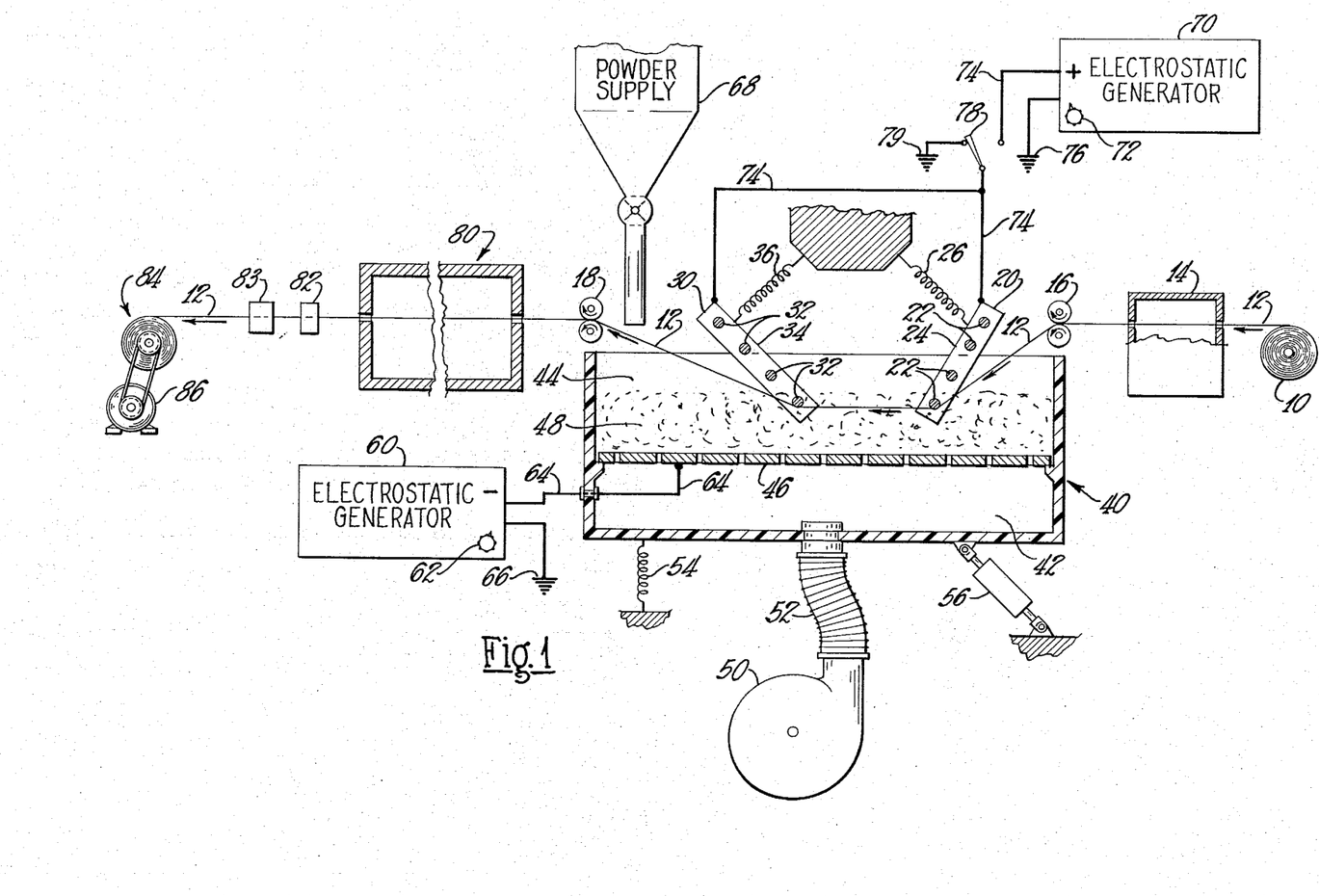
FIG. 1 is a diagrammatic view illustrating novel apparatus for carrying out the novel feature of this invention.

Referring now to FIG. 1 there is generally indicated at 10 a supply of multi-filament strand which may be a forming tube, a roving package, a yarn package, a feed roll or the like of the material to be impregnated. It should be noted that although only a single strand is shown in illustrating the principles of this invention, a mat, web, fabric, or the like made up of multi-filament strands may have the strands thereof impregnated according to the principles set forth herein. They may be dispensed from a supply 10 and processed in a manner similar to that shown for the single strand.

A strand 12 is taken from the supply 10 and passed through a steam chamber 14 to a pair of driven nip rolls 16 positioned prior to the exposure of the strand to the fluidized suspension of particulate material. The driven nip rolls 16 cooperates with a pair of driven nip rolls 18 located downstream from the fluid suspension of particulate material to regulate the tension of the strand while it is passing through the fluid suspension of materials. Tension may be regulated by driving the nip rolls at different speeds, applying a friction brake to otherwise freely rotating nip rolls 16, and other approaches known in the art.

The multi-filament strand passes from the first pair of nip rolls 16 beneath and in contact with a first electrode means 20. The electrode means 20 comprises a plurality of crossbars 22 fixed in spaced relation in side supports 24. The crossbars 22 are shown in section and only one side support 24 is illustrated to clarify the operation of this portion of the apparatus. One of the crossbars, advantageously the uppermost, may extend out through the side support 24 and be pivotally supported by means not shown to enable the electrode 20 to freely swing about the axis of the uppermost crossbar.

The plurality of cross bars are used to provide a stiffness to the electrode structure and, if the electrode is not pivoted, to provide different fixed heights from the plate 46 for passage of the strand through the fluidized bed.

A bias spring 26 may be connected in tension or compression to the pivotally supported electrode 20 to assist in yieldably controlling the tension on the strand while the strand is in the fluidized bed.

Similarly, a second electrode means 30 is located downstream from the first electrode means 20 and includes a plurality of crossbars 32 extending between side supports 34, an uppermost of the crossbars being pivotally supported and a lowermost of the crossbars being in contact with the strand. A bias spring 36 may be utilized to yieldably assist in controlling the tension of the strand in the fluidized bed. Only one of the bias springs 26, 36 on the electrodes illustrated may be used to control the strand tension. Further, in alternate constructions of the means for providing a fluidized bed of particles, two electrodes may not be necessary, nor it may not be necessary to pivotally support such electrodes other than to enable convenient threading of the strands through the apparatus.

A container for the particulate impregnating material is indicated generally at 40 and includes bottom and side walls and an open top. While a top opening container is illustrated, it should be noted that other forms of particulate impregnant containers may be utilized in which the top is closed and the strand is passed in through one side and out another side to enable better control of powder dispersion, temperature, etc. A first air plenum chamber 42 of container 40 is separated from a second powdered impregnant particle chamber 44 by a foraminous metal plate 46. A bed of particulate impregnating powders 48 is shown in the second chamber 44. The supply in the bed may be renewed or replenished by a particle supply means 68 which advantageously has a variable feed coordinated with the use of the particles from the bed 48.

The bed of particles 48 is placed in a fluidized or fluid suspension form by the use of a blower 50 connected via a duct 52 to the air plenum chamber 42. The air or gas under pressure is distributed throughout the bed 48 via perforations in plate 46 to plate the particles in a gaseous suspension. To insure a uniformity of distribution of the particles in the gaseous suspension the container 40 may be spring mounted at one or more places by springs 54 and a vibrating mechanism 56 attached to the container to vibrate the container at a frequency which establishes a uniform flow of the particles throughout the suspension, past the strand 12, and past the foraminous plate 46. The plate 46 functions as an electrode to establish an electrostatic field in the gaseous suspension of particles.

An electrostatic generator 60 is provided to establish the electrostatic field adjacent the plate 46 with an intensity which may be varied, as symbolically illustrated by the voltage varying control at 62. Different impregnant particles and different strands may require different field intensities. A coaxial cable 64 connects the generator 60 to the plate or electrode 46 and the generator 60 is advantageously grounded at connection 66.

Although not necessary in one method of practicing the invention, there is illustrated for an alternative embodiment of the invention an electrostatic generator 70 which has control means 72 to vary the voltage output thereof. The output of the generator 70 may be connected through coaxial cables 74 to the electrodes 20 and 30 via a switching means 78. The electrodes 20 and 30 are electrically isolated or insulated from ground and may be connected to ground only by operation of the switch 78 to disconnect the generator 70 from the electrodes 20 and 30, and to connect the electrodes 20, 30 to a ground connection 79. The coaxial cable 74 may also be attached to the nip roll arrangement 16 to electrostatically charge the individual filaments.

A coalescing means for the impregnated particles in the strand 12 is indicated generally at 80. The coalescing means may be an oven for thermally coalescing the impregnates, having drying, heating, and/or cooling zones depending upon the impregnant material. The coalescing means 80 may also include or be a source of plasticizers, solvent vapors, or the like, if chemical treatment of impregnants is necessary to coalesce the particles and cause them to flow about the individual filaments to which they are adhered.

A filament gathering means is indicated generally at 82 and may be utilized to rebundle the separated filaments. The filament gathering means may be located before, after, or both before and after the coalescing means 80. An extrusion die 83 may also be utilized on the strand 12 after the particles have been coalesced and flowed together, either to rid the strand of excess coalesced or flowable impregnant material or to regulate the final diameter of the impregnated strand. Further, the die 83 may be utilized if a relatively rigid rod or the like is desired.

A packaging area is indicated generally at 84 and may comprise a take-up reel if the coalesced impregnated strand is still in a flexible condition, or may be a pelletizing means if the strand is in a relatively rigid or rod-like condition. A drive motor 86 may be utilized or drive the take-up reel if the reel is used to package a flexible impregnated strand.

Figure 3:
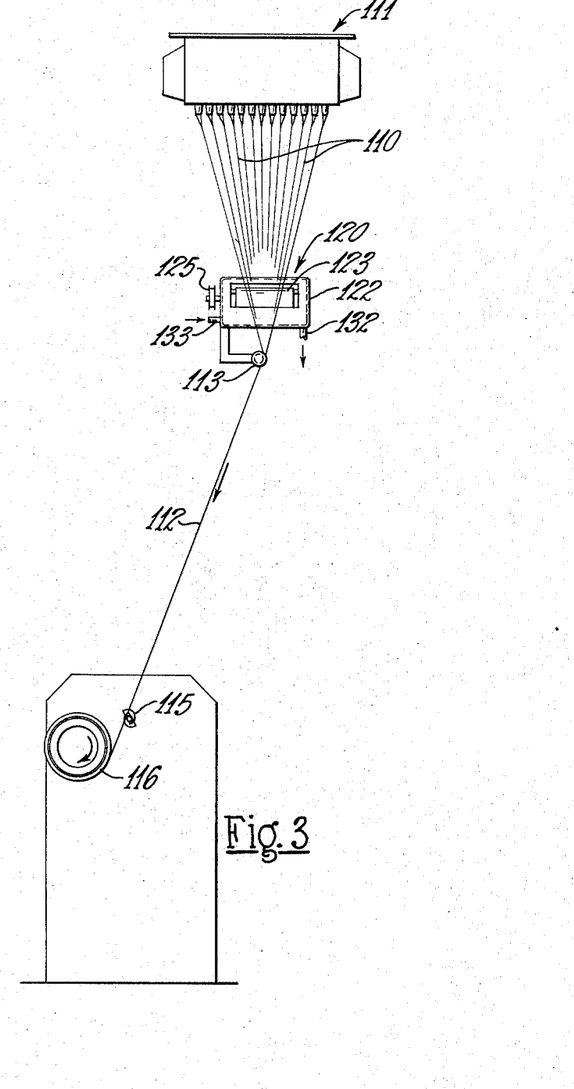
FIG. 3 is a diagrammatic view in elevation of apparatus for forming a multi-filament strand and applying a sizing to the individual filaments before combination of the filaments into a strand to enhance the separation of the filaments during a later strand opening process.

The individual filaments of the multi-filament strand may be provided with a semi-conductive layer of moisture by the steam chamber 14 in FIG. 1. But, it is also desirable to be able to provide a layer which is conductive or at least semi-conductive in itself, or will react with a liquid or gaseous bath to form or enhance the properties of a conductive layer on the filaments, before they are originally gathered in strand form. Apparatus for applying such a coating to the individual fibers, and for the production of the glass fiber strands illustrated in this invention is illustrated in FIG. 3. A multi-filament, continuous glass fiber strand may be formed from a plurality of individual glass fibers 110 attenuated from fine streams of glass which flow through a corresponding number of orifices in a wall of the glass melter or bushing indicated generally at 111. It will be observed that the fibers or filaments 110 extend in a plurality of lateral rows because the necessity for laterally spacing the individual orifices from which they are pulled. In FIG. 3 the filaments 110 are illustrated as extending transversely across the bottom wall of the bushing 111 with a plurality of strands in each individual row and with a plurality of rows of filament orifices.

In order to associate the plurality of individual filaments 110 to form a multi-filament strand 112 they are led through a guide generally indicated at 113, which may be an element having a recessed V-shaped groove in its arcuate edge.

After association of the filaments 110 to form a strand 112, the strand may be led downwardly through a traverse 115 and onto the exterior of a rotary spool generally indicated at 116 for winding the continuous strand to form a package of strand from which it can subsequently be unwound at the supply means 10 of the apparatus in FIG. 1.

An applicator station is indicated generally at 120 in FIG. 3 and includes the guide 113, a local coating or sizing material supply tank 122, a coating transfer belt 123, and the necessary apparatus for driving the transfer belt 123 including a motor (not shown) and power connection means as generally indicated at 125 which may include belt and pulley means.

The transfer belt 123 is mounted on a drum or roller which is, in turn, supported by a shaft driven from the power connecting means 125 and extending horizontally over the local supply tank 122 at such a level that the peripheral surface of the drum or roller dips beneath the level of a supply of coating or sizing material in the tank 122. The level of the coating material may be controlled in tank 122 by a weir arrangement which is open at the top. The top of the weir is spaced from the bottom of the tank 122 a distance which is equal to the depth of the coating material desired in the tank 122.

The belt 123 is also engaged over a nose or guide bar means mounted in the framework of the application station and extending parallel to the axis of the drum or roller dipping into the coating material. In the operation of the applicator station, the drum or roller is rotated at a constant speed so that the belt 123 is moved through a pool of the coating material and picks up a layer of the coating substance on its outer surface. The layer of the coating material may be leveled and metered by a metering bar means and is carried forward across a span of the belt 123 and around the nose bar means, moving in the same direction around the nose bar as the filaments 110. The filaments 110 wipe through the layer of coating material on the belt with a controlled quantity of the coating or sizing material adhereing as a layer to each of the filaments 110. That is, each filament may be submerged in and pulled out of the coating or sizing carried by the belt 123.

A supply line 133 may provide a continuous flow of freshly mixed coating or sizing material to the tank 122, with the excess coating or sizing material which flows over the weir arrangement being connected to a return line 132. The sizing or coating in the tank 122 advantageously includes a material to render the surfaces of the glass fibers 110 at least semi-conductive. Such a material may be electrolytic which includes ions which are opposite in polarity to the electrostatic charge which may be imparted to the particulate impregnant material in the bed 48 of FIG. 1. The electrolytic material is advantageously selected so that if the electrostatic charges on the particles are positive, an anionic electrolytic material is selected. A preparation to supply positive ions may include a cationicactive solution of water and a quarternary fatty acid derivative which may also function as a lubricating agent. Similarly, base material derivatives in an aqueous solution may be used to supply negative ions, and to attract positively charged particles, e.g. a hydrophylic and conductive salt solution including calcium chloride.

The other components of the size may advantageously include coupling agents to promote chemical reaction between particles and the fiber, a lubricant for processing purposes, a binder to enhance handleability properties, etc.

In addition to glass fibers shown as constituting the multi-filament strands being impregnated, one can use fibers of minerals, boron, graphite, carbon, silica, silicon carbide, and artificial or synthetic fibers which have a softening point above the softening point of the impregnating material if an oven treatment is to be used, or chemical characteristics which are not adversely affected by the coalescing treatment of the particles. Filaments of other materials not listed above are not excluded by their mere absence from the list.

The particulate or powdered impregnant particles may be of a variety of different materials depending upon the reaction of the impregnant with the strand or fibers which is desired, the physical characteristics desired for the impregnated strand after impregnation, or for the desired decorative and workability characteristics. Synthetic thermoplastic resins may be vinyl polymers such as polystyrene, copolymers of styrene and other monomers, high and low pressure polyethylenes, polypropylene and copolymers of propylene and ethylene, polyvinylchloride and copolymers of vinylchloride, products of poly addition or polycondensation such as polyamide, cellulose derivatives such as cellulose acetate, saturated polyesters and the like. For thermosetting resins, phenoplasts, epoxys, alkyds and the like may be used. One can likewise use mixtures of thermoplastic resins and thermosetting resins.

If difficulty is encountered in tendencies of particles to adhere to each other, which might ordinarily have a normally short shelf life, or with which difficulty is encountered in maintaining the material in a fluid suspension, a cryogenic drying and powdering process may be utilized. This enables the attaining of particle sizes and dispersion of materials which may not otherwise be suitably used as impregnants for a multi-filament strand in this process. Examples of these materials are rubbers, both synthetic and natural, and other relatively low melting point materials such as ionomers and other tough polymers.

In the operation of the embodiment illustrated in FIG. 1, a strand 12 is taken from the supply 10 and passed through a steam chamber 14. The steam chamber supplies steam, which may be applied under pressure if necessary, to penetrate the strand and provide each of the individual filaments therein with a moisture layer which is semi-conductive. Moreover, the steaming process may be utilized to soften any size or binders that have been previously applied to the strand for lubricating or handling purposes or to enhance the ability of the individual fibers to adhere to the particulate impregnant material or vice versa. In addition, the steam chamber 14 may be located sufficiently close to the bed of particles 48 so that the individual fibers in the strand 12 are heated to an extent which, when the oppositely charged fibers cause the attration and adherence thereto of the charged particles, an initial softening of the particles at the contact area with the fiber occurs to increase the adherence capabilities in addition to the mutual electrostatic attraction.

The temperature at which the fibers enter the bed may be controlled either by regulating the steam temperature, the distance by which the steam chamber is separated from the bed 48, by the speed at which the strand is being passed through the bed, or by a combination of these and other factors. The basic principles of operation of this invention, however, are not really affected by the temperature of the fibers as they enter the fluidized bed.

While the steam chamber illustrates a specific application of controllably moistening the individual fibers to provide an aqueous semi-conductive layer on the fibers, the chamber 14 is also representative of means for applying alternative materials to provide the semi-conductive layer desired. The bath in the chamber 14 may be a liquid bath which will penetrate the strand and coat the fibers and which will, if necessary because of the coagulating characteristics of the particles in the bed, evaporate or dry sufficiently before the strand reaches the bed to prevent an interference with the separation of the filaments and the impregnation of the strand by the particles. While a liquid fluid bath may be utilized in the chamber 14, it may be advantageous in most instances to pass the strand 12 through only a vaporous portion of the bath, since the vapors may more readily or easily penetrate the strand and avoid the problems encountered with capillary flow and attraction.

The strand 12 passes from the chamber 14 to the nip rolls 16. As noted hereinbefore the nip rolls 16 may be utilized to assist in controlling the tension of the strand 12 in the bed 48. The rolls 16 may be also utilized to remove excess moisture or as a moisture control for the strand 12 before it enters the bed 14. The rolls may also serve to heat the moisture to enable a more thorough penetration to provide the semi-conductive surface layers for the fibers. Similarly, a sponge type material, with or without a heating element, may be used for moisture control.

The principles of operation of the fluidized bed illustrated in FIG. 1 are known to those skilled in the art. A current of air, or other gases if a special atmosphere is required for either the particles or the fibers of the strand being impregnated, is passed into the plenum 42 from the blower 50, compressor or other supplier of gas under pressure indicated at 50 via the duct 52. The air or other gas is advantageously dried by suitable means and is distributed across the bed of particles 48 by a plurality of perforations through the plate 46 to suspend and fluidize the powder in the bed 48.

Upon application of a high voltage and a very low current from the electrostatic generator 60 via the coaxial cable 64 to the plate 46, the power becomes charged as it is dispersed in a fine cloud within the top portion of the container 40 and may be attracted to an object which is grounded. With some particulate materials the air flow alone through perforations in the foraminous plate 46 may be sufficient to suspend the particles in a fluidized condition. It has been discovered that a micro-porous plate, for example of sintered metal, is preferable since the gas being distributed is more evenly spread across the bottom of the fluidizing chamber and stream flow or channelization does not occur. However, with most particles it is advantageous to vibrate the container 40 by a vibrator means 56 at a frequency or amplitude which will cause a uniform flow of the particles throughout the suspension, passing the particles adjacent the plate 46 to insure charging of the particles and adjacent the strand 12 to enable attraction of the particles to the individual fibers.

The apparatus in FIG. 1 is unique not only in its micro-porous structure, but also in that it has been discovered that a substantially flat plate 46 of conductive material may be utilized. By adding a vibrating means 56 to the container 40 to insure a uniform flow of the particles throughout the suspension, the air coming through the porous plate is charged to transmit charges to the particles, and the particles are passed adjacent the grid or plate 46 to enable acquisition of the charge that is necessary for attraction of the particles throught the fibers.

The combination just recited is unique in that apparatus of the type utilized before has always required points or barbs extending upwardly from the plate 46 to impart the electrostatic charge to the particles. Alternatively, a separate air plenum top of insulating or non-conductive material with perforations therethrough has been required in combination with a separate metalic grid suspended in the bed and spaced above the air distribution plate, in order to attain sufficiently strong charges on the particles in the fluid suspension.

Thus, the novel electrostatic fluidizing apparatus illustrated in FIG. 1 is more simple to construct and much simpler to clean. When changing powders in the container or cleaning the container, one merely needs to disconnect the cable 46 and remove the substantially flat plate from the container 40 for cleaning. The cleaning process is also simplified since only flat surfaces are involved and since, if cleaning of the perforations or porosities is necessary the plate may be placed in a heated chamber to burn out particles adhered to the plate or found in the perforations or porosities. Passage of cleaning air under pressure through the perforations or porous plate portions while the plate is heated insures that the air distribution perforations or porosities are thoroughly cleaned out to enable an accurate regulation of the air flow from the air plenum to the fluidized bed.

The strand 12 proceeding from the nip rolls 16 has had the fibers thereof provided with surface layers of electrically semi-conductive layers, either by the process discussed with respect to the chamber 14 or by the precoating process illustrated in FIG. 3 or both. The strand then proceeds into the fluidized suspension of the particles 48 and contacts the lowermost crossbar 22a of the electrode 20 and the lowermost crossbar 32a of the electrode 30 as best shown in FIG. 2.

The electrodes 20 and 30 may be utilized two different manners to apply a charge to the individual filaments having a polarity which is opposite to the charge on the particles. First, the switch 78 may be closed to connect the electrodes 20, 30 to the ground connection 79. In this instance at least the lowermost crossbar 22a must be placed within the influence of the electrostatic field generated adjacent the plate 46. By a process which is not fully understood in the field of electrostatics the electrode crossbar 22a, in combination with the semi-conductive layer on each of the filaments of the strand 12, applies an electrostatic charge to the surfaces of the filaments having a polarity opposite to the charge on the particles in bed 48.

Figure 2:
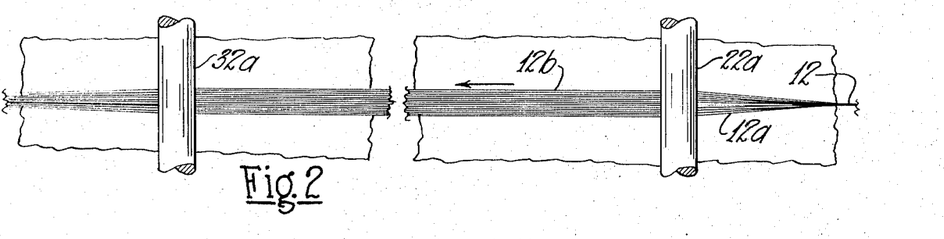
FIG. 2 is an enlarged fragmentary view illustrating the manner in which the principles of this invention spread the filaments of a strand apart to enable a thorough impregnation of the strand.

As illustrated in greater detail in FIG. 2 the charge is applied to the surfaces of the filaments by induction and/or conduction and, even before the strand 12 reaches the crossbar 22a of the electrode 20, a preseparation of the filaments is at least partially achieved as noted at 12a. The length of the pre-opening of the strand at 12a precludes the possibility that opening is being achieved by mechanical separation and/or any triboelectric effect. The charging of the surface layers of each of the fibers with like charges causes the fibers to repel each other and separate to open the strand 12 so that the particles may impregnate the strand to contact and adhere to each individual fiber.

It has been experimentally determined that without the semi-conductive layer on each of the fibers, the strand will not open fully to expose the individual filaments. Without the conductive-inductive effect, the triboelectric effect of the rubbing of the strand against the electrode will not cause full separation of the filaments from each other. Further, the mechanical spreading effect of the change in direction of the strand in the fluidized bed is not adequate to fully separate the filaments in the strand. Although a change in direction of the strand 12 around the electrode crossbars is shown, this invention may be carried out without any change in direction or with only a very slight change in direction, by passing the strand adjacent to and within the influence of the electrode means 20, 30. Contact with electrode means 20, 30 is advantageously provided in order to prevent the strand from becoming saturated. That is, it has been determined that a conductive path to ground should be established through the connection 79 for best results.

Alternatively, the switch 78 may be turned to connect the electrodes 20, 30 to the electrostatic generator 70. The field established by the electrostatic generator 70 must be opposite in polarity to that established by the generator 60. In FIG. 1 this is indicated by showing a connection to a negative terminal of the generator 60 and a connection to a positive terminal of the generator 70.

The utilization of a second electrostatic field generating means 70 provides a positive means of applying electrostatic charges to the fibers in the strand 12 and reduces or does away with the necessity to properly position the electrodes 20, 30 in the influence of the first electrostatic field generated adjacent the plate or electrode 46 and/or the spacing of the electrodes 20, 30 with respect to the plate 46 to determine the amount of influence of the electrostatic field 46 on the electrodes 20, 30 when they are connected to the ground connection 79.

While there is a substantial initial spread of the strand 12 in the section 12a before reaching the crossbar 22a of the electrode 20 the dispersion is full and complete at section 12b of the strand after the first electrode 20 has been contacted and between the electrodes 20 and 30 in the fluidized bed. As discussed hereinbefore it is not necessary to utilize both electrodes 20 and 30. However, it is advantageous to utilize two spaced electrodes, since the path of the strand through the fluidized bed in FIG. 1 may be held at a predetermined level in parallel relationship with respect to the plate 46 to assure a uniformity of charges on both particles and the layers on the surfaces of the fibers which are separated between electrodes 20 and 30.

The size and sometimes the shape of the powder of the impregnant may influence the fluidization and the attraction of the particles to the work and quality of the coating. Similarly, the size of the fibers involved also helps determine the size of the particles that should be involved. To obtain a thinner coating it is necessary to have a smaller particle size. Powders have been used in the range of 35 to a smaller than 300 mesh size, the smaller than 300 mesh size being particularly advantageously used with glass fibers since the individual filaments are very small and require a smaller particle size. A 325 mesh size has been effective with ordinary glass fiber strands.

It has also been discovered that the method and apparatus of this invention has its greatest effectiveness when utilized with strands formed from continuous fibers, since discontinuities in the fibers may interfere with the inductive or the charging effect provided by the semi-conductive layer on the fibers if the semi-conductive layer is discontinuous. Discontinuities may in some instances be tolerated if the length of the fiber is sufficient to provide a semi-conductive layer to enable the induction or application of charges to the surface of the fiber. In using vibration to improve fluidization, it has been noted that the high density powders require higher frequencies or amplitudes of vibration and less fluidizing air is required to maintain the coating material in a fluidized condition. The air pressure or flow is selected to be just high enough to obtain a good powder cloud or fluid suspension of the particles. The pressure necessary to reach this stage depends upon the properties of the powder being used.

This invention differs from prior art apparatus and methods since charges are applied both to the particles and to the surfaces of the individual fibers. Not only does the application of the electrostatic charges to the surfaces of the individual fibers enable them to repel each other and provide excellent strand opening or separation, but the charges on the individual fibers enable a strong electrostatic bond to be effected between the surfaces of the fibers and the oppositely charged particles. This permits excellent impregnation, and adhesion of the particles during the later processing of the powder impregnated strand is vastly improved. Thus, one may immediately process the powder impregnated strand 12 in a coalescing unit 80 as indicated in FIG. 1 or, with the advantages inherent in this invention, one may store the powder impregnated strand because of the unique mutual attraction characteristics achieved for an intermediate period after later processing is necessary or desirable.

Although the fluidized suspension and electrostatic charging is accomplished in the apparatus of FIG. 1 by the container 40-vibrator 56-blower 50-generator 60 combination, it should be noted that similar effects may be achieved by the use of an electrostatic powder gun or a plurality of guns having a nozzle design which permits the application of a uniform spray pattern for the particles.

In the apparatus of FIG. 1 a powder impregnated strand 12 may be further processed in a continuous operation by the coalescing means indicated generally at 80. If the means 80 is an oven and the powder is thermally coalescable, both thermosetting and thermoplastic powders may be heated to flow the particles around the individual fibers to coat the external surface of the individual filament. The rebundling or gathering means 82 may be utilized at the exit of the oven 80 to gather the filaments together to cause the coalesced particles which are still in plastic form to unite in a unitary structure with the fibers dispersed therein to provide a unitary impregnated strand at the exit of the rebundling means 82. As noted hereinbefore, the rebundling means may be utilized at the entrance of the coalescing means 80 without substantially disturbing the powdered impregnant in the strand, because of the strong mutual electrostatic attraction between the fibers and the particles as provided by the unique apparatus described herein. In the latter case, a gathering or rebundling means 82 may not then be required at the exit of the coalescing means 80, since the particles in the process of attaining a plastic condition or flowable condition may unite the strand in a unitary form desired.

An extrusion die means 83 may be utilized in addition to or in place of the rebundling means 82 to determine the final size of the unitary strand and/or to remove excess impregnant from the strand. The extrusion die means 83 may be also utilized if it is desired to obtain a strand which has rigid or rod-like characteristics which may be chopped into pellets or broken into pellets at a packaging station 84. In this instance, nip roll means may be used to pull the rod-like form through die 83 before pellets are formed. A flat ribbon form may also be provided by suitable die or press roll means.

The packaging area indicated generally at 84 may include a take-up reel if the coalesced impregnated strand is still flexible. A drive motor 86 rotates the take-up reel 84 and assists in controlling the tension of the strand 12 through the coalescing means 80, and/or the rebundling means 82, and/or the die 83.

The coalescing means 80 may also utilize chemical or thermochemical reactions to coalesce the impregnated powder around the individual fibers. For example the vapors of a solvent may be circulated around the fibers in the coalescing means 80 to cause the particles to become plastic or flowable and remain that way until the solvent is driven off by suitable means known to those skilled in the art.

There has thus been disclosed herein an apparatus for impregnating a strand made up of a plurality of filaments. A fluid suspension of particulate impregnating material is provided and the particles of the material are electrostatically charged with charges of like polarity. Multi-filament strands may be opened and the plurality of strand filaments separated from each other by electrostatically charging the individual filaments or the surfaces thereof with like charges to cause the filaments to repel each other, the filament charges being opposite in polarity to the charges on the impregnant material particles. The filaments are advantageously treated to make at least the surfaces thereof electrically semi-conductive to enable the application and retention of an electrostatic charge. The charge to the filament surfaces may be applied through an induction-conduction process, and/or a separating or opening charge may be applied to the fibers by an electrostatic field which is opposite in polarity to the electrostatic field used for the particle charging.

Figure 4:
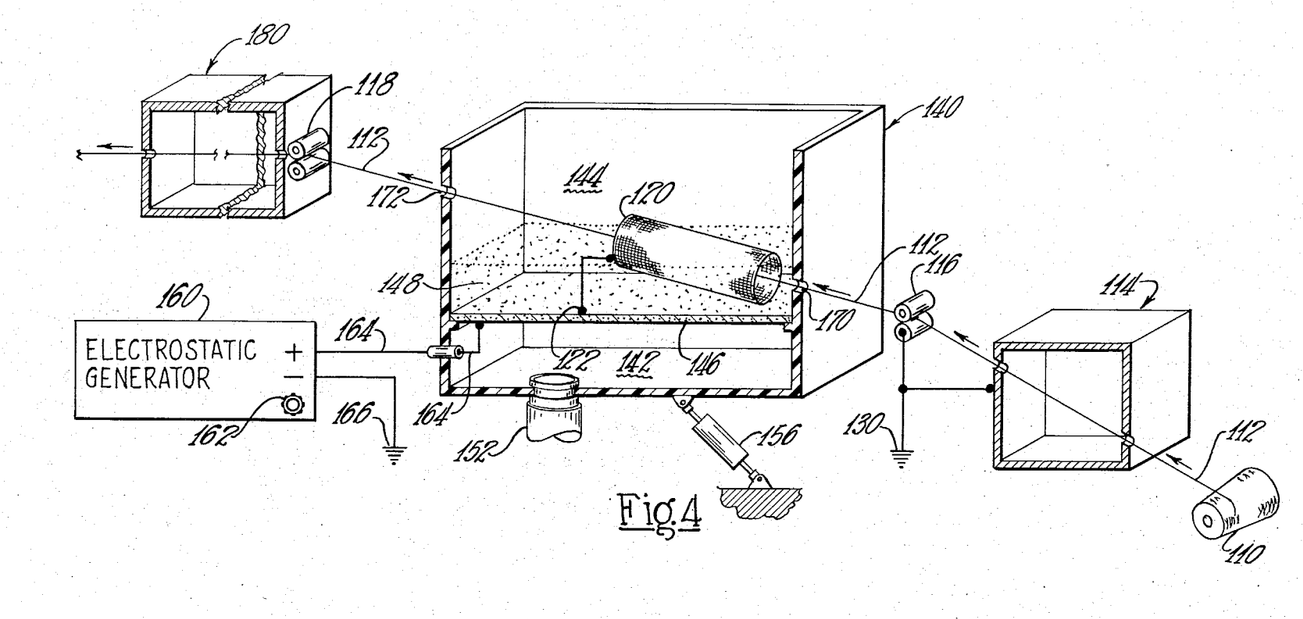
FIG. 4 is a diagrammatic view of a second embodiment illustrating the teachings of this invention.

Referring now to FIG. 4 there is indicated at 110 a supply of multi-filament strand to be impregnated. A strand 112 is taken from the supply 110 and passed through a steam chamber 114 to a pair of nip rolls 116 positioned prior to the exposure of the strand to the fluidized suspension of particulate material. The nip rolls 116 may cooperate with a pair of nip rolls 118 located downstream from the fluid suspension of particulate material to regulate the tension of the strand while it is passing through the fluid suspension of materials.

By regulating the speeds of rotation of the pairs of nip rolls with respect to each other in a manner known to those skilled in the art, the strand 112 may have a positive tension, zero tension, or negative tension (allowing a droop or sag) applied thereto while the strand 112 is passing through the fluidized bed. This tension control may be used as an aid in controlling the distance that the filaments will be spread apart in response to the like polarity of electrostatic charges on the surfaces thereof, and thus as an aid in regulating the degree of impregnation of the strand or the amount of particulate material adhering to the filaments. Thus, although the use of nip roll arrangements as described herein is not necessary, they may be advantageously used to achieve different results. Moreover, nip rolls may be used only prior to or only after the exposure of the strand to the fluidized bed, depending upon the strand supply and strand takeup arrangements, to achieve the results set forth above.

The multi-filament strand 112 passes from the first pair of nip rolls 116 through an entry port 170 formed in a side wall of a container 140, through a hollow cylindrical electrode 120 and a fluidized bed 148 in an upper powdered impregnant particle chamber 114 of the container, and out of an exit port 172 in an opposite wall of the container 140 to the second pair of nip rolls 118. From the nip rolls 118 the strand 112 is led through an oven or other particle coalescing means 180 to a collecting station of one of the types described for the apparatus of FIG. 1.

A lower gas plenum chamber 142 of the container 140 is separated from the particle chamber 144 by a porous metal plate 146. The bed of particulate impregnating powder 148 is placed in a fluidized or fluid suspension form by the use of a blower, compressor, or other source of gas under pressure (not shown) which is connected via duct 152 to the plenum chamber 142. The gas under pressure is distributed throughout the bed 148 via the pores in the porous metal plate 146. As noted hereinbefore, the plate may advantageously be constructed from a sponge type metal or a sintered metal, such as sintered stainless steel, with micro porous openings therethrough to provide the most even distribution of gas throughout the bed 148. A vibrating mechanism 156 may be used to vibrate the container at a frequency and/or amplitude which will establish a uniform flow of particles throughout the fluidized bed 148. The plate 146 also functions as an electrode to establish an electrostatic field in the gaseous suspension of particles.

An electrostatic generator 160 is provided to establish the electrostatic field adjacent the plate 146 with an intensity that may be varied, as symbolically illustrated by the voltage varying control at 162. A coaxial cable 164 connects the generator 160 to the plate or electrode 146 and the generator 160 is grounded at 166 to enable the application of an electrostatic charge to each of the particles in the fluidized bed in the manner described hereinbefore with respect to the apparatus of FIG. 1.

The operation of the embodiment shown in FIG. 4 differs from that described in FIG. 1 in that it illustrates that the strand 112 need not touch an electrode in the fluidized bed, but needs only to be within the influence of an electrostatic field produced in the fluidized bed 148 to enable an induction of an electrostatic charge on the semi-conductor layer on each of the filaments in the strand. The electrostatic surface charge on the semi-conductive layer of each filament is opposite in polarity to the electrostatic charges on the particles in the fluidized bed. However, the filament surface charges are all alike in polarity thereby causing the filaments to repel each other to cause the strand to open to enable the penetration of the strand by the oppositely charged particles and the adherence of the particles to the individual filaments.

The hollow cylindrical electrode 120 is electrically connected at 122 to the plate 146. Other configurations may be used for the electrode 120, e.g. spherical, rectangular or triangular prisms, and the like, but the strand 112 does not need to touch the electrode 120. The metal electrode 120 may be constructed from a screen material such as hardware cloth.

To enhance the induction process on the semi-conductive layers on the individual filaments in the strand, the nip roll arrangement 116 and/or the steam bath chamber 114 is advantageously grounded. It is theorized that the grounding of the steam bath or the nip roll arrangement provides a control on the degree of humidification to place a semi-conductive layer of the proper thickness on each of the individual filaments, and may further provide a conductive path that will enable the best application of electrostatic charges to the individual filaments.

The bundle of filaments opens or spreads out in response to the induction of like electrostatic charges of the surface of each filament as the strand enters the influence of the electrostatic field in the fluidized bed. In experiments with the apparatus shown in FIG. 4, speeds up to 925 feet per minute were obtained when the electrostatic field strength was 10 kilovolts per inch. These experiments were conducted with an untwisted, multifilament glass fiber strand passed through a bed of powdered nylon 12 resin. It was found that the configuration of the electrode 120 was not as important as being able to maintain the distance between the electrode 120 and the grid or electrode plate 146 substantially constant.

Good experimental results were obtained with very fine particle size materials, such as a powdered 325 mesh Flexclad Vitel resin manufactured by Goodyear, a powdered 325 mesh XPS26300 polypropylene manufactured by Amoco (Avisun), and a powdered 200 mesh phenolic resin. Satisfactory results have been obtained using relatively sharp fractions of powdered polyester resins from 120 to 150 mesh.

Since the fibers or filaments will pick up the smaller particles first, satisfactory products can be made from coarser mesh materials if provision is made for a constant flow of the powdered material into and out of the bed so that the supply of the smaller particles will be constantly renewed. For example, a satisfactory polypropylene impregnated strand by using a nominal 35 mesh material (such as the powdered PC 072 polypropylene resin manufactured by Amoco), if a relatively high field intensity in kilovolts per inch is used and if the larger remaining particles are removed as new powdered material is supplied.

A combination of powdered materials having different compositions and different particle sizes may be used to produce products having particular characteristics. For example, a coarse powdered polystyrene was added to the finer powdered polypropylene resin noted in the preceding paragraph. The strand was impregnated by the polypropylene with spaced bumps of polystyrene fused to the outside of the coalesced impregnated strand. The bumps are useful in that they will assist in mechanically keeping the strand in a desired position in the end product.

Thus, the invention disclosed herein may be used to provide an impregnated strand in flexible, relatively rigid or rigid form which may have round, rectangular, square, flat ribbon, etc. types of cross-sectional configurations. The impregnated strands may or may not have protrusions fused to and spaced along the length to provide a means for mechanically holding the impregnated strand in position in a product utilizing the impregnated strands.

In conclusion, it is pointed out that while the illustrated examples constitute practical embodiments of our invention, we do not limit ourselves to the exact details shown, since modification of these details may be made without departing from the spirit and scope of this invention.

We claim:

1. Apparatus for impregnating a strand formed from a plurality of non-conducting filaments, comprising
   a. means for providing a gaseous suspension of electrostatically charged dry solid particluate strand impregnant material,
   b. means for treating the surfaces of said non-conductive filaments of said strand to form moistened filament surfaces which are at least semi-conductive,
   c. means for separating said moistened filaments including means effective to apply like electrostatic charges to said moistened semi-conductive surfaces of said filaments to cause said filaments to repel each other, said filament charges being opposite in polarity to said charges on said particulate strand impregnant material, and
   d. means for contacting said filament separated strand with said gaseous suspension to enable charged particles to be adhered to the surfaces of said filaments.

2. Apparatus as defined in claim 1 in which said surface treating means includes means for penetrating said strand with steam to moisten the surfaces of said filaments.

3. Apparatus as defined in claim 1 in which said surface treating means includes means for applying a sizing having an electrolytic material therein to said filaments before said filaments are gathered together in strand form.

4. Apparatus as defined in claim 1 in which said fluid suspension providing means includes
   a. container means constructed of material which is electrically non-conductive,
   b. said container means having a first air plenum chamber and a second particle retaining chamber,
   c. means for separating said two chambers including a substantially flat foraminous plate of electrically conductive material, and
   d. means for connecting an electrostatic generator to said foraminous plate thereby enabling said plate to function both as an air distributor to fluidize a bed of particles in said second chamber and as a means for imparting an electrostatic charge to said fluidized particles.

5. Apparatus as defined in claim 4 which further includes means for vibrating said container to insure uniform circulation of said particles in said fluidized bed and the application of an electrostatic charge to all of said particles.

6. Apparatus as defined in claim 1 in which
   a. said charged particle suspension means includes means for establishing an electrostatic field to apply an electrostatic charge of a first polarity to said particles, and in which
   b. said strand opening means includes a grounded electrode disposed within the influence of said established electrostatic field and contacting said strand enabling the imparting of charges of a second polarity to the treated surfaces of said filaments.

7. Apparatus as defined in claim 1 in which
   a. said charged particle suspension means includes means for establishing an electrostatic field to apply an electrostatic charge of a first polarity to said particles, and in which
   b. said strand opening means includes electrode means contacting said strand for imparting charges of a second polarity to the treated surfaces of said filaments.

8. Apparatus as defined in claim 7 in which said strand opening means further includes means for connecting said electrode means to means for generating an electrostatic field of said second polarity.

9. Apparatus as defined in claim 1 in which said filaments are glass fibers.

10. Apparatus as defined in claim 9 in which said particulate impregnant material is powdered synthetic resin.

11. Apparatus as defined in claim 9 in which said impregnant is a thermosetting resin.

12. Apparatus as defined in claim 10 in which said impregnant is a thermoplastic resin.

13. Apparatus as defined in claim 9 in which said impregnant is powdered polyethylene.

14. Apparatus as defined in claim 9 in which said impregnant is powdered polypropylene.

15. Apparatus as defined in claim 9 in which said impregnant is polyvinyl chloride.

16. Apparatus as defined in claim 9 in which said impregnant is a powder prepared by a cryogenic drying process.

17. Apparatus as defined in claim 16 in which said impregnant is a cryogenically dried and powdered rubber material.

* * * * *